United States Patent
Riedinger et al.

(10) Patent No.: US 9,000,978 B2
(45) Date of Patent: Apr. 7, 2015

(54) METHOD OF DETERMINING NAVIGATION PARAMETERS FOR A CARRIER AND HYBRIDIZATION DEVICE ASSOCIATED WITH KALMAN FILTER BANK

(75) Inventors: Didler Riedinger, Paris (FR); Sébastien Vourc'h, Paris (FR); Ghaleb Hoblos, Le Grand Quevilly (FR)

(73) Assignee: Sagem Defense Securite, Paris (FR)

( * ) Notice: Subject to any disclaimer, the term of this patent is extended or adjusted under 35 U.S.C. 154(b) by 613 days.

(21) Appl. No.: 13/383,407

(22) PCT Filed: Jul. 9, 2010

(86) PCT No.: PCT/EP2010/059854
§ 371 (c)(1),
(2), (4) Date: Jan. 10, 2012

(87) PCT Pub. No.: WO2011/003994
PCT Pub. Date: Jan. 13, 2011

(65) Prior Publication Data
US 2012/0105278 A1    May 3, 2012

(30) Foreign Application Priority Data
Jul. 10, 2009  (FR) ...................................... 09 54849

(51) Int. Cl.
*G01S 19/20* (2010.01)
*G01S 19/47* (2010.01)
*G01C 21/16* (2006.01)

(52) U.S. Cl.
CPC ............... *G01S 19/20* (2013.01); *G01C 21/165* (2013.01); *G01S 19/47* (2013.01)

(58) Field of Classification Search
CPC .......... G01S 19/20; G01S 19/47; G01S 19/49
USPC ............. 342/357.58, 357.3, 357.32; 701/472, 701/480
See application file for complete search history.

(56) References Cited

U.S. PATENT DOCUMENTS 6,691,066 B1 * 2/2004 Brodie .......................... 702/185
7,219,013 B1 * 5/2007 Young et al. .................. 701/472
(Continued)

FOREIGN PATENT DOCUMENTS

WO    WO 2008/040658    4/2008

OTHER PUBLICATIONS

Mohamed, A. H. et al, "Adaptive Kalman Filtering for INS/GPS," Journal of Geodesy (1999) 73: 193-203.*
(Continued)

*Primary Examiner* — Gregory C Issing
(74) *Attorney, Agent, or Firm* — Blakely Sokoloff Taylor & Zafman (57) ABSTRACT

A process for determination of navigation parameters of a carrier by a hybridisation device comprising a bank (3) of Kalman filters, each working out a hybrid navigation solution from inertial measurements calculated by a virtual platform (2) and raw measurements of signals emitted by a constellation of satellites supplied by a satellite-positioning system (GNSS), characterised in that it comprises the steps of:
  determination for each satellite of at least one probability ratio between a hypothetical breakdown of given type of the satellite and a hypothetical absence of breakdown of the satellite,
  declaration of a breakdown of given type on a satellite as a function of the probability ratio associated with this breakdown and of a threshold value,
  estimation of the impact of the breakdown declared on each hybrid navigation solution, and
  correction of hybrid navigation solutions as a function of the estimation of the impact of the breakdown declared.

14 Claims, 2 Drawing Sheets

(56) References Cited

U.S. PATENT DOCUMENTS

| | | | |
|---|---|---|---|
| 2003/0117317 A1* | 6/2003 | Vanderwerf et al. | 342/357.02 |
| 2006/0074558 A1* | 4/2006 | Williamson et al. | 701/213 |
| 2007/0156338 A1* | 7/2007 | Coatantiec et al. | 701/214 |
| 2007/0265810 A1* | 11/2007 | Martin et al. | 702/190 |
| 2009/0182493 A1* | 7/2009 | McDonald et al. | 701/200 |
| 2010/0049439 A1* | 2/2010 | Cho et al. | 701/216 |
| 2012/0123679 A1* | 5/2012 | Riedinger et al. | 701/480 |

OTHER PUBLICATIONS

Curt Call et al., "Performance of Honeywell's Inertial/GPS Hybrid (HIGH) for RNP Operations," Position, Location, and Navigation Symposium, 2006 IEEE/ION Coronado California, Apr. 25, 2006, p. 224, Piscataway, NJ, USA.

* cited by examiner

METHOD OF DETERMINING NAVIGATION PARAMETERS FOR A CARRIER AND HYBRIDIZATION DEVICE ASSOCIATED WITH KALMAN FILTER BANK

This is a non-provisional application claiming the benefit of International Application Number PCT/EP2010/059854 filed Jul. 9, 2010.

GENERAL TECHNICAL FIELD

The field of the invention is that of carriers using information provided both by an inertial unit and by a satellite navigation system, such as for example a GPS system.

The invention relates to a process and a hybridisation device, and more particularly relates to the detection of satellite breakdowns and the correction of the impact of such breakdowns.

PRIOR ART

Carriers such as aircraft or even ships have numerous navigation systems. Examples of these systems especially are INS/GNSS hybrid equipment (from English "Inertial Navigation System" and "Global Navigation Satellite System").

An inertial unit provides low-noise information which is precise in the short term. However, in the long term, location performance of an inertial unit degrades (more or less quickly as a function of the quality of sensors, accelerometers or gyroscopes for example, and processing used by the unit). If the information acquired from a satellite navigation system is as such highly unlikely to drift over the long term, it is often noisy however and varies in its precision. Also, inertial measurements are always available whereas GNSS information is not or is likely to be misled and scrambled.

Hybridisation consists of combining the information supplied by the inertial unit and the measurements provided by the satellite navigation system to obtain information on position and speed by benefiting from both systems. In this way, the precision of measurements provided by the GNSS receiver controls the inertial drift and the low-noise inertial measurements filter the noise on the measurements of the GNSS receiver.

Modern navigation systems calculate a protection volume around the calculated position which contains the position error true to a given risk of integrity, and this is what defines the integrity of a system.

For an aircraft, this protection volume is in the form of a vertical cylinder relative to the surface of the earth. This cylinder is defined by its radius and its height, respectively known as horizontal protection limit (HPL) and vertical protection limit (VPL).

According to the prior art, these HPL and VPL are for example determined by means of a bank of Kalman filters which protects against potential breakdown of a satellite.

These filters execute hybridisation between the information coming from the satellite navigation system and those coming from the inertial unit. One of the filters of the bank of filters, designated by the term principal filter, utilises all the GNSS measurements constituted by pseudo-measurements and information on the quality of the latter. The other filters, called secondary, of the bank of filters use only part of the measurements GNSS available. If a breakdown occurs at the level of a satellite measurement, it will not be seen by the secondary filter not receiving this measurement: this secondary filter will therefore stay uncontaminated.

2

Each filter works out a hybrid navigation solution as well as (horizontal and vertical) protection beams associated with this solution and calculates for example from the covariance associated with the position error estimated by the filter. The HPL and VPL protection limits around the true position are then determined from the protection limits associated with the solutions supplied by each filter of the bank.

Using such a bank of Kalman filters was proposed in document U.S. Pat. No. 7,219,013, according to which the protection beams are calculated using the separation solution method, whereas detection and exclusion of a satellite breakdown utilise surveillance of innovation residue of Kalman filters.

However, this architecture does not isolate breakdowns caused by weak drifts, such that it proves necessary to complete surveillance of innovation residue by a method called least-squares method using GNSS information only.

The applicant has developed devices using such a bank of filters, an example of which is presented in its patent application FR 0858726 filed on Dec. 17, 2008.

The architecture proposed in this application has a bank of Kalman filters, in which each filter is associated with a correction module for GNSS measurements at the input of the filter as a function of its output. The hybrid navigation solution is determined by correction of the inertial state as a function of the outputs of the filters of the bank of filters.

However, the architecture proposed in this document does not prove to be totally satisfactory. If it permits detection of a breakdown and exclusion of measurements coming from the identified satellite in breakdown, it proposes no solution for evaluating the impact of the breakdown on the navigation solution. In fact, detection is based on an instantaneous statistical test which is triggered only when the breakdown reaches a detection threshold. In this way, even if the satellite in breakdown has been isolated, the navigation solution cannot be corrected and a residual error persists originating from data corrupted by the breakdown prior to their identification. Because of this, the protection beam significantly increases in case of satellite breakdown, even though the latter is detected.

In patent application EP 1 914 561 the applicant describes a process for determining a reliable protection volume in the event of satellite breakdown.

The proposed process is based on selection of a sub-group of satellites in the constellation, and the consideration of a hypothetical breakdown for calculation of protection beams by each filter of the bank of filters. The risk of integrity is distributed across a number of hypotheses to contemplate the breakdown of a satellite.

If the determined protection volume is reliable, it is no less affected by a satellite breakdown, in which case it increases significantly. The performances of this process therefore can still be refined.

Also, the inventions proposed in these applications do not distinguish the type of breakdown, in particular bias or ramp, but declare the presence of one of these breakdowns only.

In addition, no detection period is restricted, and nothing indicates that the hybrid solution is at any given moment corrupted by a breakdown which will be detected next.

PRESENTATION OF THE INVENTION

The invention proposes eliminating at least one of these disadvantages and aims in particular at reducing the protection beam in the event of satellite breakdown.

To this effect, the invention proposes according to a first aspect a process for determination of navigation parameters of a carrier by a hybridisation device comprising a bank of Kalman filters each working out a hybrid navigation solution from inertial measurements calculated by a virtual platform and raw measurements of signals emitted by a constellation of satellites delivered by a satellite-positioning system (GNSS), comprising the steps of:
- determination, for each satellite, of at least one probability ratio between a hypothetical breakdown of given type of the satellite and a hypothetical absence of breakdown of the satellite,
- declaration of a breakdown of given type on a satellite as a function of the probability ratio associated with this breakdown and of a threshold value,
- estimation of the impact of the breakdown declared on each hybrid navigation solution, and
- correction of the hybrid navigation solutions as a function of the estimation of the impact of the breakdown declared.

The process according to the first aspect of the invention is advantageously completed by the following characteristics, taken singly or in any of their technically possible combinations:
- for each satellite, at least one probability ratio is determined at each incrementation of the Kalman filter on a sliding storage window, a breakdown of given type being declared if the sum of the probability ratios associated with this breakdown on the sliding storage window is greater than the associated threshold value,
- the process also comprises, if a breakdown is declared, a step of exclusion of raw measurements of signals emitted by the satellite declared in breakdown,
- the process also comprises a confirmation test step of a breakdown comprising running a statistical test on innovations over a determined period following a declaration of breakdown, each innovation reflecting the spread between an observation corresponding to a raw measurement originating from a satellite not declared to be in breakdown and an a posteriori estimation of said observation worked out by a Kalman filter using raw measurements originating from all the satellites of the constellation, the declaration of the satellite in breakdown being cancelled if the statistical test is negative,
- the process also comprises a calculation step, for each satellite, of a cross innovation and a covariance of cross innovation reflecting the spread between an observation corresponding to a raw measurement originating from the satellite and an a posteriori estimation of said observation worked out by a Kalman filter not using the raw measurement originating from the satellite, the probability ratio being determined as a function of cross innovation and cross covariance innovation provided by said Kalman filter not using the raw measurement originating from the satellite and from an estimation of the impact of the breakdown of given type on said cross innovation,
- the impact of the breakdown of given type on said cross innovation is estimated by determination, from data provided by said Kalman filter not using the raw measurement originating from the satellite, of a dynamic innovation matrix, and estimation of an amplitude of the breakdown of given type on a sliding estimation window corresponding to a given number of incrementations of said Kalman filter not using the raw measurement originating from the satellite, the dynamic innovation matrix representing a link between the amplitude of the breakdown and the spread caused by the breakdown on cross innovation,
- the given number of incrementations of said Kalman filter correspond to a period less than a predetermined detection period,
- estimation of the amplitude of the breakdown of given type is done on the sliding estimation window by a method by a minimisation method by the least-squares method or else by a Kalman filter,
- estimation of the impact of the breakdown on each hybrid navigation solution comprises determination, for each hybrid navigation solution, from data provided by the Kalman filter working out the hybrid navigation solution, of a dynamic navigation matrix, and estimation of an amplitude and covariance of the breakdown of given type on a sliding estimation window corresponding to a given number of incrementations of said Kalman filter working out the hybrid navigation solution, the dynamic navigation matrix representing a link between the amplitude of the breakdown and the spread caused by the breakdown on said hybrid navigation solution,
- two probability ratios are determined for each satellite, one ratio being associated with a hypothetical breakdown of bias type and the other ratio being associated with a hypothetical breakdown of ramp type,
- if a breakdown of bias type is declared during the declaration step, the estimation step of the impact of the breakdown on each hybrid navigation solution is done on a sliding estimation window from the moment of declaration of the breakdown of bias type,
- if a breakdown of ramp type is declared, the estimation step of the impact of the breakdown on each hybrid navigation solution is taken on the sliding estimation window preceding the moment of declaration of the breakdown of ramp type, and
- if several sums of probability ratios are greater than their associated threshold value, a single breakdown is declared during the declaration step, said breakdown corresponding to the greater of the sums of probability ratios.

According to a second aspect the invention proposes a hybridisation device comprising a virtual platform capable of calculating inertial measurements, a bank of Kalman filters each designed to work out a hybrid navigation solution from the inertial measurements and raw measurements of signals emitted by a constellation of satellites supplied by a satellite-positioning system (GNSS), the device also comprising:
- a detection module configured to determine, for each satellite, at least one probability ratio between a hypothetical breakdown of given type by ratio and a hypothetical absence of breakdown of the satellite and to declare a breakdown of given type as a function of the probability ratio associated with the breakdown of given type and of a threshold value,
- an accommodation module configured to estimate the impact of the breakdown declared on each hybrid navigation solution worked out by a Kalman filter, and to correct hybrid navigation solutions as a function of the estimation of the impact of the breakdown declared.

The invention has numerous advantages.

The invention in particular estimates the impacts of a breakdown on the hybrid navigation solution and corrects them. The position provided is therefore more precise.

The invention detects the slow drifts by statistical tests on a sliding window.

The invention also differentiates breakdown detection of bias type and breakdown of ramp type, and applies a correction as a consequence.

Also, the invention favours detection of breakdowns within a period less than a predetermined detection period.

When a satellite is not being used by each of the secondary filters, in the presence of a satellite breakdown one of the secondary filters is not contaminated and retains an uncorrupted navigation solution.

The hybrid navigation solution supplied by each filter of the bank is corrected. Consequently, the overall protection beam is reduced.

PRESENTATION OF THE FIGURES

Other aspects, aims and advantages of the present invention will emerge more clearly from the following description which is purely illustrative and non-limiting, and which must be considered in reference to the attached diagrams, in which.

DETAILED DESCRIPTION

Figure 1:
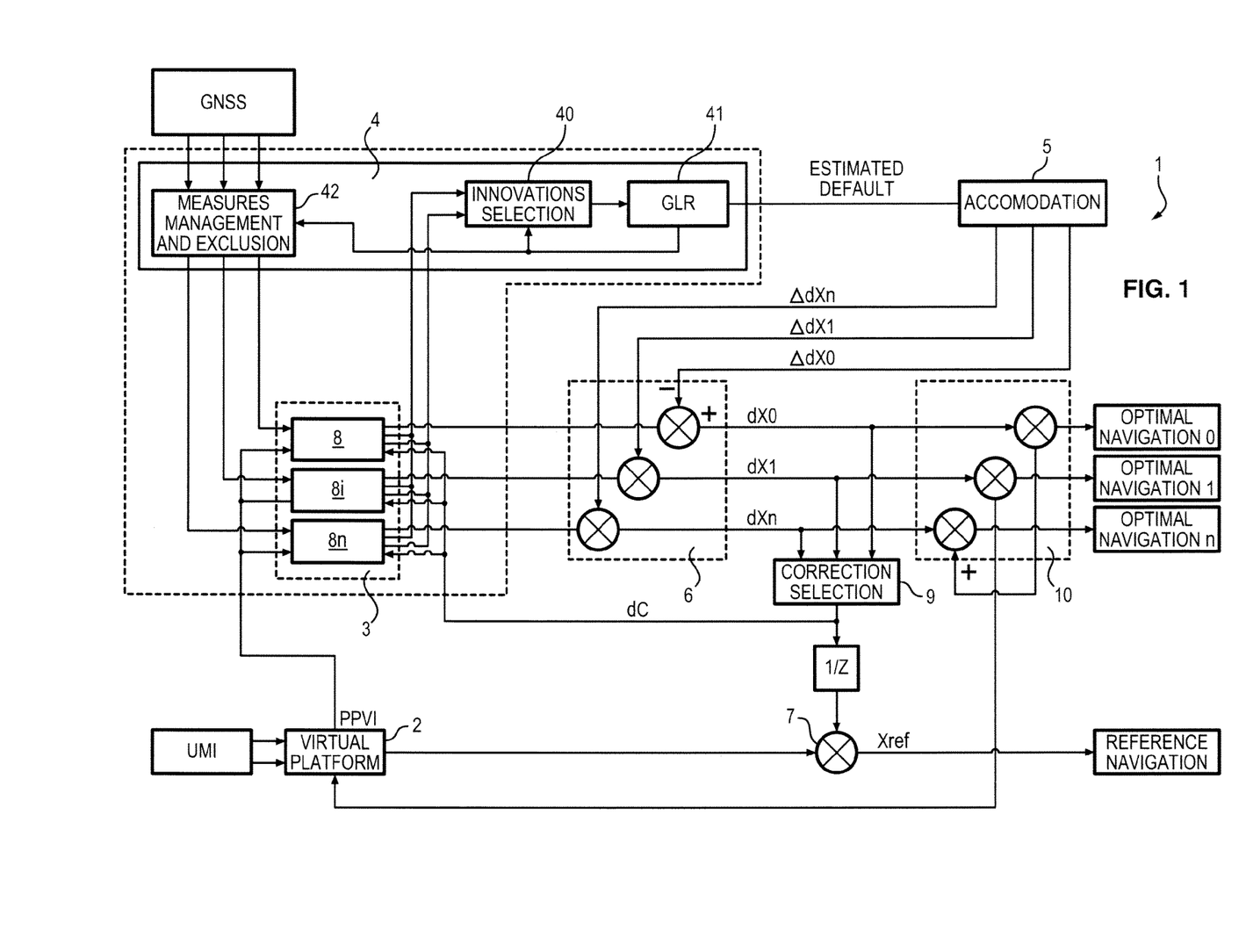
FIG. 1 is a diagram illustrating a possible embodiment of a device according to the second aspect of the invention, FIGS. 2a and 2b schematically illustrate the increase in the protection beam in case of satellite breakdown, respectively within the scope of a hybridisation device of the prior art and of a hybridisation device according to the second aspect of the invention.

In reference to FIG. 1, this shows a hybridisation device 1 in keeping with a possible embodiment of the second aspect of the invention, designed to be embedded within a carrier such as an aircraft.

The hybridisation device 1 utilises information provided by a UMI inertial unit and by a GNSS satellite navigation system, and also comprises a virtual platform 2 and a bank of Kalman filters 3.

The virtual platform 2 receives inertial increments originating from sensors (gyroscopes, accelerometers) of the inertial unit. The inertial increments correspond especially to angular increments and to speed increments. Information on inertial navigation (such as attitudes, speed or position of the carrier) is calculated by the virtual platform 2 from these increments. This information on inertial navigation is designated as PPVI inertial measurements hereinbelow.

These PPVI inertial measurements are transmitted to a device for calculating pseudo-distances estimated a priori (not shown in FIG. 1) which also receives data on the position of the satellites. The device for calculating pseudo-distances estimated a priori calculates pseudo-distances a priori between the carrier and the different satellites visible from the carrier from some of the inertial measurements and from others by data on the position of the satellites.

The hybridisation device 1 also receives from the satellite navigation GNSS system the pseudo-measurements between the carrier and the different visible satellites. The spreads (called observations) between the pseudo-measurements estimated a priori and the pseudo-measurements supplied by the GNSS system are then calculated conventionally.

The hybridisation device 1 also comprises a bank of Kalman filters 3 executing hybridisation between the inertial information originating from the inertial unit and the information of the satellite navigation system. Apart from a function for supplying statistical information on the output measurements, the role of the filter is to maintain the virtual platform 2 in a field of linear image operation of that modelled in the Kalman filter by each estimating a dX0-dXn state vector.

Via a conventional method known per se, the bank of filters 3 comprises several Kalman filters in parallel. One of the filters is called principal Kalman filter 8 which takes into account all the observations (and to do this receives all the measurements coming from the GNSS system) and devises a principal hybrid navigation solution.

The other filters 8i, 8n are called secondary filters which take into account only some of the observations, for example (n−1) observations among n observations relative to n visible satellites such that the i secondary Kalman filter 9i receives from the GNSS system the measurements of all satellites except for the i, and each works out a secondary hybrid navigation solution.

It is evident that the process for devising observations described above is not common to all the filters of the bank of filters 3, but is executed for each of the filters. In this way, calculation of the pseudo-distances a priori and calculation of the observations mentioned above are not common to all the filters, but the hybridisation device 1 according to the invention executes these calculations or each filter of the bank of filters 3.

Within the scope of the closed-loop architecture illustrated in FIG. 1 the hybridisation device 1 devises an Xref hybrid output ("Reference navigation") corresponding to the PPVI inertial measurements calculated by the virtual platform 2 and corrected, via a subtractor 7, by a stabilisation vector dC having as many components as the state vectors estimated by the Kalman filters.

The invention is not however limited to such architecture, but extends to open-loop or green architecture in which the subtractor 7 is not active.

To devise the hybrid navigation solutions, the device 1 comprises a bank of summers, in which each summer is positioned at the output of a filter of the bank for adding the Xref hybrid output to the dX0-dXn state vector devised by the filters.

It is evident that the output hybrid Xref serves internally only. This is the information delivered at output of the summer 10 which provide the optimal navigation solution.

The Xref hybrid output can be relooped to the input of the virtual platform 2.

Also, as is illustrated in FIG. 1, a dC stabilisation vector can be applied to the input of each of the filters of the bank 3. In this way, each filter is adjusted by subtracting from its estimation the correction dC and is kept consistent with the virtual platform 2

The hybridisation device also comprises a module 9 for working out the stabilisation vector dC whereof two embodiments are indicated hereinbelow by way of non-limiting examples.

According to a first possible embodiment, the corrections to be applied to the inertial measurements come from a single filter. In this way, the stabilisation vector dC is equal, in all its components, to the state vector estimated by the selected Kalman filter. Selection is made for example inside the module 4 as per document EP1801539 A by detection of a possible satellite breakdown.

According to a second embodiment possible, the stabilisation vector dC is worked out component by component, using for each component the array of Kalman filters. The module 9 for working out the correction dC is configured to work out each of the components dC[state] of the stabilisation vector dC as a function of all the corresponding components dX0[state]-dXn[state] of the correction vectors dX0-dXn. Each of the components is worked out for example in keeping with patent application FR0858721 filed on Dec. 17, 2008 by the applicant.

According to a variant embodiment of the invention illustrated in FIG. 1, a correction module of satellite measurements 5 is connected to each filter, providing the filter with measurements (typically pseudo-measurements) from the satellite-positioning GNSS system which are used by the filter after correction by means of the hybrid navigation solution worked out by the filter. This correction module 5 forms the subject matter of patent application FR 0858726 filed on Dec. 17, 2008 by the applicant.

Hereinbelow, a satellite in breakdown is defined as being a satellite which sends incorrect information in its message, leading to a spread (fixed or variable) between its real position and the position given in its message.

The hybridisation device 1 according to the invention comprises a module 4 for detection and exclusion of satellite breakdowns comprising a detection module 41 configured to conduct the steps of:
- determination, for each satellite, of at least one probability ratio Ir, Ir' between a hypothetical breakdown of given type of the satellite and a hypothetical absence of breakdown of the satellite,
- declaration of a breakdown of given type on a satellite as a function of the probability ratio Ir, Ir' associated with this breakdown and of a threshold value.

Advantageously, for each satellite, at least one Ir, Ir' probability ratio is determined at each incrementation of the Kalman filter on a sliding storage window, and a breakdown of given type is declared if the sum of the probability ratios Ir, Ir' associated with this breakdown on the sliding storage window is greater than the associated threshold value.

A probability ratio is representative of the probability that the breakdown of given type with which it is associated affects the corresponding satellite. For example, if a probability ratio associated with a breakdown of given type is positive, it is more probable that said breakdown affects the corresponding satellite. The greater the probability ratio, the greater the probability that its corresponding satellite is corrupted by the breakdown with which it is associated.

The threshold value can be the same for several satellites and/or for several kinds of breakdown, or else the threshold values can be different for each satellite and for each kind of breakdown, in which case each probability ratio or advantageously each sum of probability ratios can is compared to a threshold value which is particular thereto.

The size of the sliding storage window can vary as a function of the type of the breakdown, or else a single size of sliding window can be provided.

As will be explained in detail hereinbelow, the module 4 for detection and exclusion of satellite breakdowns also utilises a function for management and exclusion of GNSS measurements for monitoring.

In the embodiment illustrated in FIG. 1, the module 4 for detection and exclusion also comprises a module 42 for managing satellite signals which receives the GNSS measurements and routes this information to the Kalman filter 3 as a function of the circumstances (no satellite detected as being faulty; exclusion of a satellite detected as being faulty).

The hybridisation device according to the second aspect of the invention also comprises an accommodation module 5 designed to carry out the steps of:
- estimation of the impact of a breakdown on the hybrid navigation solution worked out by the Kalman filter 3, and
- if a breakdown is declared, correction of the hybrid navigation solution as a function of the estimation of the impact of the breakdown, The function of the accommodation module 5 is to evaluate the spreads $\Delta X$, $\Delta X_i$, ... $\Delta X$ caused by a breakdown on the hybrid navigation solutions worked out by the Kalman filters 8, 8i ... 8n and to correct the hybrid navigation solutions, for example by means of a bank of subtractors 6. The invention is not however limited to this architecture and estimation of the impact of the breakdown on the hybrid navigation solution can be done alternatively by the Kalman filters, by the detection module 41, or again by any other means adapted known to the expert.

Calculation methods developed by the applicant for determining the probability ratios and impact of a breakdown on the hybrid navigation solution will now be described. These formulae are given by way of illustration and in no way constitute a limitation of the invention.

Advantageously, the probability ratios are determined as a function of data provided by the Kalman filters comprising in particular innovations and innovation covariances, and from an estimation of the impact of the breakdown of given type on the innovations.

Innovation means a spread between an observation a priori by a Kalman filter and an a posterriori estimation of this observation worked out by the filter.

Each filter therefore delivers n innovations, as many satellites as in the constellation.

In particular «cross innovation» is called the innovation provided by each secondary Kalman filter 8-i representing the spread between an observation a priori originating from the satellite whereof the secondary filter 8i receives no data, and an a posterriori estimation of this observation.

The bank of Kalman filters delivers n*(n+1) innovations, whereof n are cross innovations.

Advantageously, the detection and exclusion module 4 of breakdowns satellites comprises an innovation-selection module 40 configured to select the innovations (cross or not) and the innovation covariances and to route them to the module 41.

Advantageously, the module 40 is configured for transmitting cross innovations, or classic innovations, to the module 41 for calculating probability ratios, The advantage of using cross innovation, relative to conventional innovation tests, is that the filter which tests a satellite in breakdown is not disrupted by the breakdown.

In particular, the i secondary Kalman filter 9i receives from the GNSS system the measurements of all the satellites except for the i, and accordingly devises the state vector dXi independently of the satellite i, such that this filter 8i is not disrupted by a potential breakdown affecting the satellite i.

The cross innovation of a satellite corresponds for example to the spread between the pseudo-distance on said satellite supplied by the satellite-positioning system and an a posterriori estimation of this pseudo-distance provided by a Kalman filter not using the pseudo-distance supplied by the satellite, such that this estimation is independent of the satellite. The calculation of the probability ratio will therefore not be perturbed by a breakdown, and especially by a slow breakdown, of the satellite.

It is specified here that cross innovation can generally be applied to any raw measurement, for example to a pseudo-speed measurement (also called Doppler measurement).

Preferably, the Ir probability ratio associated with a breakdown of given type is determined, at a given moment, by the following formula:

$$Ir_t = \epsilon_t^T S_t^{-1} \epsilon_t - (\epsilon_t - \rho_t)^T S_t^{-1} (\epsilon_t - \rho_t)$$

in which:
- $\epsilon_t$ represents the innovation vector of the Kalman filter at the moment t
- $S_t$ represents the covariances of the innovations at the moment t, and $\rho_t$ represents the spread due to the breakdown on the innovation vector at the moment t.

$^T$ represents the transposition of a matrix or of a column vector.

$\rho_t$ is unknown, but it can be estimated on a sliding estimation window. Preferably, the spread due to the breakdown on the hybrid navigation solution is estimated in parallel, a spread which will be seen β, hereinbelow.

These estimations can be implemented according to the following formulae:

$$\rho_t = \phi_t^T \hat{v}_t$$

$$\beta_t = \mu_t^T \hat{v}_t$$

in which:

$\hat{v}_t$ is an estimation of the amplitude of the breakdown, $\phi_t$ is a dynamic innovation matrix, representing a link between the amplitude of the breakdown and the spread caused by the breakdown on the innovation, and $\mu_t$ is a dynamic navigation matrix, representing a link between the amplitude of the breakdown and the spread caused by the breakdown on the hybrid navigation solution.

The two dynamic matrices at the moment t are advantageously calculated by the detection module 41 from data provided by the Kalman filter, preferably cross recursively, that is, for any moment t, φt and μt are calculated as a function of $\phi_{t-1}$ and $\mu_{t-1}$.

Said data provided by the Kalman filter 3 can comprise a Kalman gain, and transition and observation matrices.

The amplitude of the breakdown is advantageously estimated on a sliding estimation window corresponding to a given number N of incrementations of the Kalman filter.

According to an advantageous variant, the estimation can be done by estimation by the least-squares method on the sliding estimation window, preferably by the following formula:

$$\hat{v}_t = (\Sigma_{i=t-N+1}^{t} \phi_i^T S_i^{-1} \phi_i^T)^{-1} \cdot (\Sigma_{i=t-N+1}^{t} \phi_i^T S_i^{-1} \epsilon_i)$$

Advantageously, the given number N of incrementations of the Kalman filter corresponds to a duration lasting less than a predetermined detection period T. In particular, in noting δ the period of incrementation of the Kalman filter 3, the sliding estimation window must verify: N.δ≤T.

This sliding estimation window is advantageously the same as the sliding storage window of the probability ratios associated with the breakdown.

This detection period restricts the size of the sliding window and limits the calculation load.

If a satellite is declared to be in breakdown, the estimation of spreads evaluated by the module 5 at the moment t on the hybrid navigation solution worked out by each Kalman filter 8i is:

$$\Delta X_i = \beta_t = \mu_t^T \hat{v}_t$$

where $\beta_t$ was calculated from the innovation using an observation a priori of the satellite declared in breakdown. The innovation-selection module 40 is advantageously configured such that, in this case, only these innovations are provided to the detection module 41 and to the accommodation module. In this way, innovation selection estimates the impact of a breakdown detected from the innovations using information provided by the satellite declared in breakdown.

Also, the spread on the covariance $P_i$ of the error associated with the hybrid navigation solution worked out by the Kalman filter 8i is also estimated by the following formula:

$$\Delta P_i = \mu_t^T \hat{P}_t \mu_t$$

where $\hat{P}_t$ is the covariance of the estimated fault at the moment $t^{\hat{v}_t}$.

Preferably, the detection module 41 is capable of storing the probability ratios of each satellite and for each breakdown of given type on the sliding storage window.

The estimations of the impact of the breakdown on the hybrid navigation solutions provided by the filters are taken at the level of the bank of subtractors 6. By addition of the output hybrid at the level of the bank of summers 10, each filter 8, 8i, 8n produces an optimal navigation solution of the type:

$$X_{ref} + dXi - \Delta X_i$$

whereof $\hat{P}_t$ the covariance of the associated error is corrected by $\Delta P_i$.

Figures 2A, 2B:
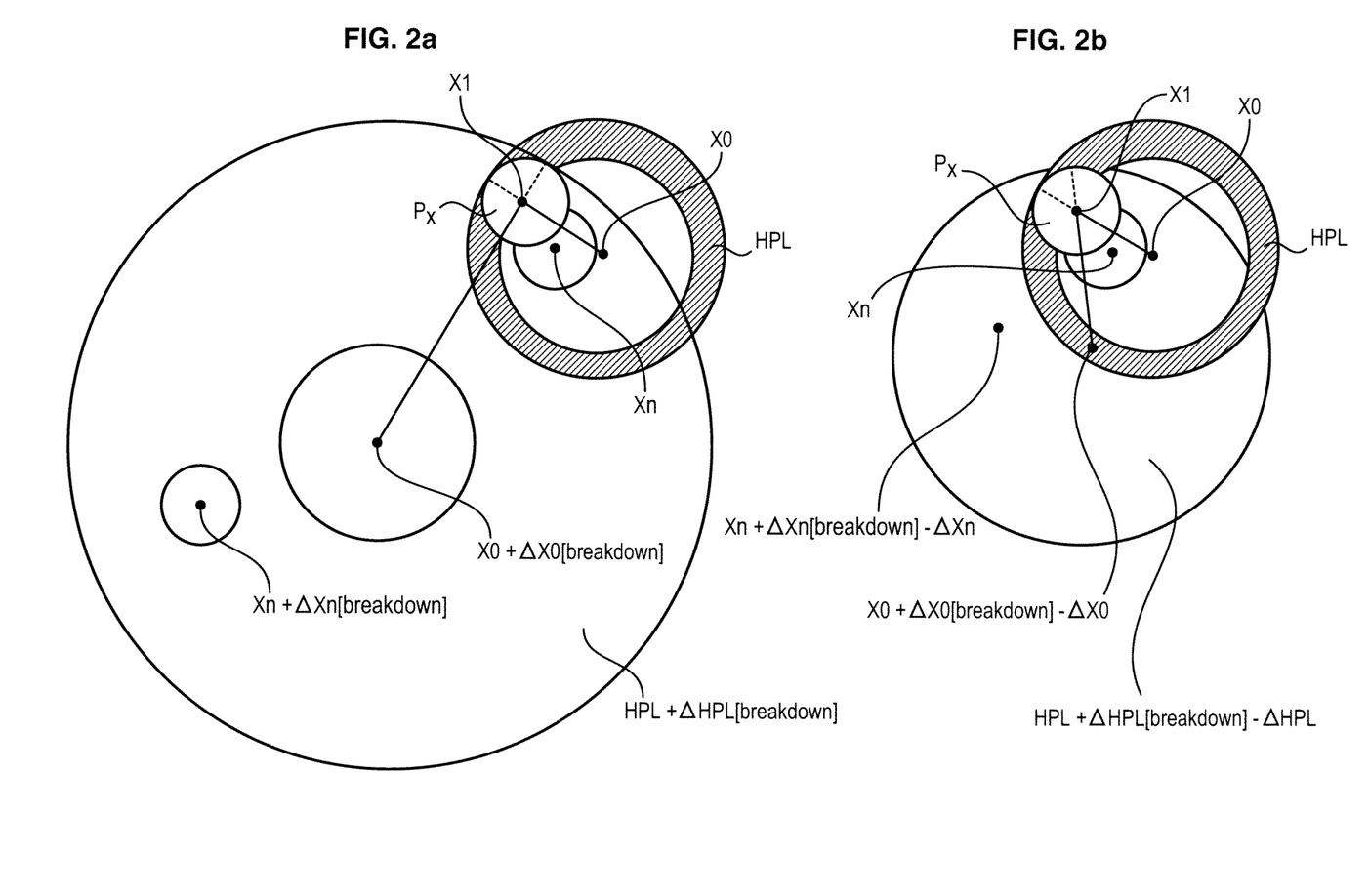

The correction made at output of each filter reduces the spread between the positions estimated by each of the filters of the bank, and accordingly reduces the overall protection beam, as illustrated in FIGS. 2a and 2b.

FIG. 2a shows the increase of the horizontal protection limit in case of breakdown in terms of a hybridisation device of the prior art. The optimal navigation solutions are designated X0, X1, Xn and are illustrated with their protection limit. The horizontal protection limit, around the position X0 estimated by the principal filter, is designated HPL.

It is supposed here that a breakdown affects the first satellite of the constellation. The suffix [breakdown] has been added to identify the magnitudes affected by the breakdown. The first secondary filter does not take into account the measurements originating from the satellite in breakdown; the position estimated by this filter is not affected and stays the same. By comparison, the positions estimated by the other filters of the bank, in particular the position X0, are modified. The horizontal protection limit increases significantly.

A similar diagram could illustrate the increase in the vertical protection limit.

The invention significantly limits the increase of the horizontal and vertical protection limits, and therefore of the protection volume in case of breakdown, by correcting the optimal navigation solutions affected by the breakdown. As illustrated in FIG. 2b, the distances between the positions estimated by the different filters are sharply reduced, and therefore the protection limit (HPL or VPL) is also reduced.

According to an advantageous variant, two Ir, Ir' probability ratios are determined for each satellite, one Ir ratio being associated with a hypothetical breakdown of bias type and the other Ir' ratio being associated with a hypothetical breakdown of ramp type.

In particular, the dynamic innovation matrix determined for each incrementation of a Kalman filter is different for a breakdown of bias or ramp type. For each satellite, the two probability ratios Ir, Ir' are therefore different.

The invention differentiates the occurrence of a breakdown of bias type or else of a breakdown of ramp type, If a breakdown of bias type is detected, the step of estimation of the impact of the breakdown on the hybrid navigation solution is advantageously made on a sliding estimation window from the moment of declaration of the breakdown of bias type. Therefore, if a breakdown of bias type is detected the sliding estimation window is left active for a determined time, sufficient for estimating the characteristics of the breakdown.

Advantageously, estimation of the characteristics of the breakdown of bias type is a function of the moment of appearance of the breakdown, that is of the moment when the sum of the probability ratios associated with the breakdown of bias type has exceeded its associated threshold value. Exclusion of the measurements by the device 42 is implemented only after this estimation.

If a breakdown of ramp type is detected, the estimation of the impact of the breakdown on the hybrid navigation solution is preferably done on the sliding estimation window preceding the moment of declaration of the breakdown of ramp type.

An exclusion confirmation phase during which the hypothetical breakdown is verified by a statistical test is advantageously provided A test is preferably conducted over a determined period as to whether the innovations of the principal filter—except that concerning the satellite detected in breakdown—follow a law of $\chi_2$. If the test is positive, the exclusion is validated, and if not it is ignored and the satellite is not excluded.

Advantageously, if several sums of Ir, Ir' probability ratios are greater than their associated threshold value, a single breakdown is declared by the detection module 41. This breakdown corresponds to the greater of the sums of probability ratios for all the breakdowns contemplated over all satellites.

In this way, if two satellites are likely to be declared in breakdown, only the more probable breakdown is effectively declared and if two breakdowns of different types are likely to be declared, only the more probable breakdown is effectively declared.

The invention claimed is:

1. A process for determination of navigation parameters of a carrier by a hybridisation device comprising a bank (3) of Kalman filters each working out a hybrid navigation solution from inertial measurements calculated by a platform (2) and raw measurements of signals emitted by a constellation of satellites supplied by a satellite-positioning system (GNSS), each satellite being potentially affected by a breakdown, each breakdown being defined by a type of breakdown, comprising the steps of:
determination, for each satellite, of at least one (Ir, Ir') probability ratio which represents the probability that a breakdown of a given type affects said satellite, the probability ratio being computed based on data provided by the bank of Kalman filters,
declaration of a breakdown of given type on a satellite by comparison of the probability ratio associated with the breakdown with a threshold value,
estimation of the impact of the breakdown declared on each hybrid navigation solution, and
correction of the hybrid navigation solutions as a function of the estimation of the impact of the breakdown declared.

2. The process as claimed in claim 1, in which, for each satellite, at least one (Ir, Ir') probability ratio is determined at each incrementation of the Kalman filter on a sliding storage window, a breakdown of given type being declared if the sum of the (Ir, Ir') probability ratios associated with this breakdown on the sliding storage window is greater than the associated threshold value.

3. The process as claimed in claim 2, also comprising, if a breakdown is declared, a step of exclusion of raw measurements of signals emitted by the satellite declared in breakdown.

4. The process as claimed in claim 3, also comprising a step breakdown confirmation test comprising conducting a statistical test on innovations over a determined period following a declaration of breakdown, each innovation reflecting the spread between an observation corresponding to a raw measurement originating from a satellite not declared in breakdown and a posteriori estimation of said observation worked out by a Kalman filter using raw measurements originating from all the satellites of the constellation, the declaration of the satellite in breakdown being cancelled if the statistical test is negative.

5. The process as claimed in claim 1, 2, 3 or 4, also comprising a calculation step, for each satellite, of cross innovation and covariance of cross innovation reflecting the spread between an observation corresponding to a raw measurement originating from the satellite and an a posteriori estimation of said observation worked out by a Kalman filter not using the raw measurement originating from the satellite, the (Ir, Ir') probability ratio being determined as a function of cross innovation and of cross covariance innovation provided by said Kalman filter not using the raw measurement originating from the satellite and from estimation of the impact of the breakdown of given type on said cross innovation.

6. The process as claimed in the claim 5, in which the impact of the breakdown of given type on said cross innovation is estimated by determination, from data provided by said Kalman filter not using the raw measurement originating from the satellite, of a dynamic innovation matrix, and estimation of an amplitude of the breakdown of given type on a sliding estimation window corresponding to a given number (N) of incrementations of said Kalman filter not using the raw measurement originating from the satellite, the dynamic innovation matrix representing a link between the amplitude of the breakdown and the spread caused by the breakdown on cross innovation.

7. The process as claimed in claim 6, in which the given number (N) of incrementations of said Kalman filter corresponds to a duration lasting less than a predetermined detection period (T).

8. The process as claimed in claim 5, in which estimation of the amplitude of the breakdown of given type is done on the sliding estimation window by a minimiation method by the least-squares method or else by a Kalman filter.

9. The process as claimed in claim 1, in which the estimation of the impact of the breakdown on each hybrid navigation solution comprises determination, for each hybrid navigation solution, from data provided by the Kalman filter working out the hybrid navigation solution, of a dynamic navigation matrix, and estimation of an amplitude and covariance of the breakdown of given type on a sliding estimation window corresponding to a given number of incrementations of said Kalman filter working out the hybrid navigation solution, the dynamic navigation matrix representing a link between the amplitude of the breakdown and the spread caused by the breakdown on said hybrid navigation solution.

10. The process as claimed in claim 1, in which two (Ir, Ir') probability ratios are determined for each satellite, one (Ir) ratio being associated with a hypothetical breakdown of bias type and the other (Ir') ratio being associated with a hypothetical breakdown of ramp type.

11. The process as claimed in claim 8, in which, if a breakdown of bias type is declared during the declaration step, and the estimation step of the impact of the breakdown on each hybrid navigation solution is done on a sliding estimation window from the moment of declaration of the breakdown of bias type.

12. The process as claimed in claim 8, in which, if a breakdown of ramp type is declared, the step of estimation of the impact of the breakdown on each hybrid navigation solution is done on the sliding estimation window preceding the moment of declaration of the breakdown of ramp type.

13. The process as claimed in claim 1, in which, if several sums of (Ir, Ir') probability ratios are greater than their associated threshold value, a single breakdown is declared during the declaration step, said breakdown corresponding to the greater of the sums of probability ratios.

14. A hybridisation device comprising a platform (2) capable of calculating inertial measurements, a Kalman filter (3) designed to devise a hybrid navigation solution from inertial measurements and raw measurements of signals emitted by constellations of satellites delivered by a satellite-positioning system (GNSS), each satellite being potentially affected by a breakdown each breakdown being defined by a type of breakdown, further comprising:
- a detection module (41) configured to
- determine for each satellite at least one (Ir, Ir') probability ratio which represents the probability that a breakdown of a given type affects said satellite, the probability ratio being computed based on data provided by the bank of Kalman filters, and declare a breakdown of given type on a satellite by comparison of the probability ratio associated with this breakdown with a threshold value, and
- an accommodation module (5) configured to estimate the impact of the declared breakdown on the hybrid navigation solution devised by the Kalman filter, and to correct the hybrid navigation solution as a function of the estimation of the impact of the declared breakdown.

* * * * *